Feb. 26, 1963   J. B. MALLARD   3,078,879
PLIANT WEATHER RESISTANT PIPE END CLOSURE
Filed April 21, 1958
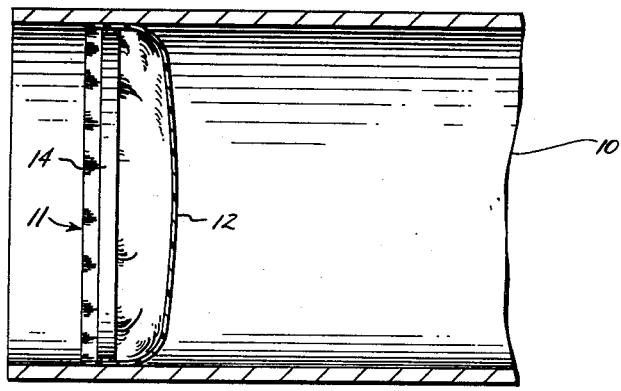
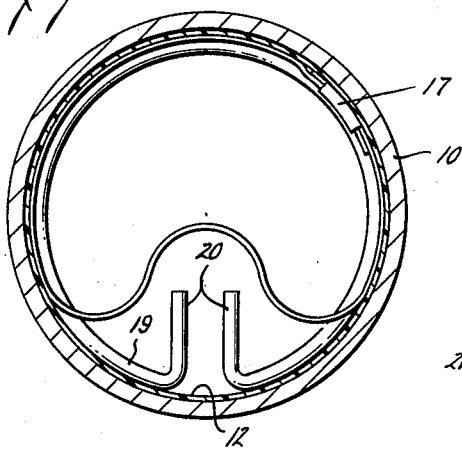
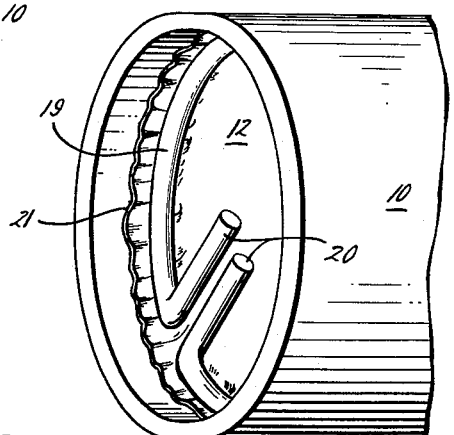
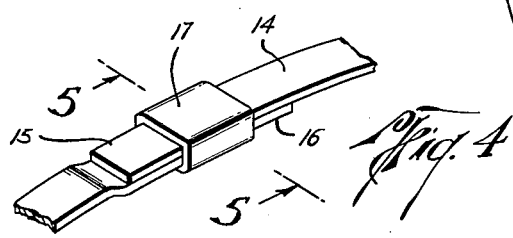
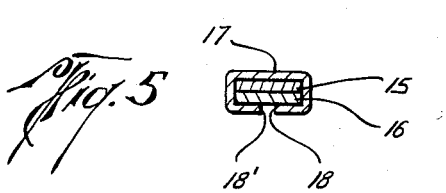
James B. Mallard
INVENTOR.
BY Wm. E. Ford
ATTORNEY United States Patent Office 3,078,879
Patented Feb. 26, 1963

3,078,879
PLIANT WEATHER RESISTANT
PIPE END CLOSURE
James B. Mallard, Houston, Tex., assignor of twenty percent to C. C. Sublett, Jr., twenty percent to H. G. Sutton, twenty percent to H. G. Sutton, Jr., twenty percent to B. M. Sutton, and twenty percent to J. E. Sutton
Filed Apr. 21, 1958, Ser. No. 729,574
1 Claim. (Cl. 138—96)

This invention relates to a pipe end closure, in particular to an inexpensive closure, which is easily cut from stock for quick and easy installation within a pipe end and firmly held in closure position therein by an inexpensive band which is easily fabricated and easily installed.

It is consequently an object of this invention to provide a pipe end closure which is comprised of a minimum number of inexpensive parts, installed with a minimum of tools, and with a minimum amount of labor.

It is another object of this invention to provide a pipe end closure which reacts appropriately to heat, cold, winds, and other weather, and which also permits a slight passage of air through the end closures so that the pipe is not filled with completely stale air, with its attendant harmful consequences, but rather the air is constantly refreshed in very minor but ample degree while the inside of the pipe is provided with a vapor phase inhibitor to render moisture therein non-corrosive.

Other and further objects will be apparent when the specification hereinbelow is considered in connection with the accompanying drawings, in which:

FIG. 1 is an elevation, part in section, showing a pipe end closure as encompassed by this invention, in place in a pipe to be closed;

FIG. 2 is an isometric view of the end of the pipe, showing an early step in the process of fabricating and installing the pipe end closure which is shown completed in FIG. 1;

FIG. 3 is a transverse sectional view showing a later step in installing and fabricating the pipe end closure;

FIG. 4 is an isometric view of the band end connection of the band employed to complete the pipe end closure fabrication and installation; and FIG. 5 is a transverse sectional elevation taken along line 5—5 of FIG. 4.

Referring in detail to the drawings in which like reference numerals are assigned to corresponding elements in the various views, a pipe 10 is shown in FIG. 1 having a pipe end closure 11 installed within the end thereof such closure comprising a closure member 12, such as a sheet of polyethylene or similar plastic material, held in place by a band, as a metallic band 14. The closure member is of a tough, weather resistant material, which is sufficiently pliant and resilient to yield in degree to suddenly impelled forces, but which can be relied upon to hold its position in the pipe 10, as retained therein by the band 14, and which can be relied upon further to resist rupture except as may result from pointedly penetrating media.

The band 14 is of a length from end 15 to end 16 greater than the inner periphery of the pipe 10, so that such ends overlap in degree. A crimp seal 17 is slid over one end of the band, as the end 15, and then the other end 16 of the band 14 is slid under the end 15 and through the crimp seal 17. Thereafter force is applied to the crimp seal 17 in such a manner that its opposed edge faces 18, 18′ are drawn together, and thus the band ends 15, 16 are bound together firmly in non-slip relationship.

In each case the amount of band end overlap has first been measured so that the diameter of the band is just very slightly less than the inner periphery of the pipe, and slightly greater than the natural inner diameter the closure member would take within the pipe. Thus, as will be hereinafter described, when the band is crimped together to proper diameter, and correctly installed within the closure member within the pipe, the closure member will be urged against the pipe by the band in such manner as to firmly press the closure member and bind it against displacement and with sufficient tightness to resist any fluid leakage between the pipe and the closure member.

The sheet of plastic, as polyethylene, required for a closure member may be cut from a bolt or wound web of the plastic, so that the result is a rectangular or square sheet which is of dimensions in both directions a bit in excess of the outer diameter of the pipe in which the sheet is to be installed. After the sheet is thus cut it is placed over the entrance to the end of the pipe in which it is to be installed and a tool 19 is placed against the side of the sheet outwardly of the pipe. Such tool 19 is of round rod material and is naturally formed as a spring, the outer diameter of which is greater than the inner diameter of the pipe. As formed the tool 19 does not extend as a complete circle but is interrupted short thereof, and provided with two inwardly extending end members or handles 20.

In order to force the plastic sheet into the pipe 10, the handles 20 are grasped and manually drawn together and the tool 19 is urged against the sheet to urge it into the pipe in the manner shown in FIG. 2, so that there is an overlap band or ring of material 21 outwardly of the tool 19. The confinement of the sheet 12 between the pipe 10 and the tool 19 holds the part of the sheet thus constrained in round form. But since the sheet has been cut as a square or rectangle, there results an overfolding of the sheet 12 so that surface equal to slightly less than the difference between the combined length of the four sides of the sheet and the inner diameter of the pipe is overfolded, whereas the part of the sheet inwardly of the tool 19 takes the form of a bowl, dome, or dish of depth determined by the amount of excess of the sheet dimensions as cut over the diameter of the pipe.

After the tool 19 has been urged against to urge the sheet within the pipe for a desired distance inwardly of the end of the pipe, the handles are released so that the tool firmly binds the sheet or closure member 12 against the pipe. Then a band 14 is inserted into the pipe, the band being pressed axially inwardly as shown in FIG. 3 until the inner edge bears against or is proximate the tool 19, then the band 14 may be released to spring outwardly, and finally any slight part thereof that may still arch inwardly may be hammered outwardly against the sheet so that all of the outer band surface will then be firmly urging outwardly against the sheet 12. Then the handles 20 of the tool 19 may be grasped and the tool contracted so that it may be withdrawn outwardly past the band 14, leaving the pipe end closure, as comprised of the sheet 12 and band 14, completely fabricated and installed.

In practice it develops that it is desirable to protect the inside of pipe in a manner that will inhibit the occurrence of rust and corrosion, and until such times as a pipe section thus protected may be connected into a pipe line or otherwise employed. To this end a number of products have been employed, but as long as such products permitted vaporization of the inherent moisture in the air within a pipe, a certain amount of rust or corrosion occurred.

Only until recently has it been discovered that a product which can supply the nitrite ion tends to render moisture non-corrosive. This discovery has resulted in eliminating the need for air tight pipe end closures, since now it is not too important that the inherent moisture in an original entrapped volume should best be all of the moisture which may enter a pipe. As long as there is enough of a nitrite ion supplying product fed into the pipe prior to it being closed, a certain amount of air may pass into the pipe after it is closed, and such air may slowly replace the original air or add moisture to the original entrapped volume, and corrosion may still be minimized. Such nitrite ion supplying products are termed vapor phase inhibitors and may be crystalline structures such as dicyclohexylammonium nitrite, having an odor related to the well known odor of "moth balls," and which may be sprayed or injected into the pipe from either end just before the pipe end closure is put in place to close the pipe ends.

The present invention results in a very great saving in cost of material and labor and the saving stems in great degree from the discovery that vapor phase inhibitors can render moisture non-corrosive, and thus it is no longer necessary to effect a perfect pipe end seal. This is true since the vapor phase inhibitors can render noncorrosive the amount of additional moisture which can leak by pipe end closures as hereinabove described, and thus slight leakage can occur through overfolded surfaces resulting from installing a rectangular or square closure sheet into a pipe end.

The structure of the closure member 12 is determined by the extent the length and breadth dimensions thereof exceed the diameter of the pipe 10. If there is substantial excess of dimension over the pipe diameter the effect when installed in the pipe is to provide a longer extending pipe contacting or sleeve part 21 and also a substantially dished or closure portion extending across the pipe, as shown in FIG. 1 which closure portion is convex with relation to the outer surface of the sleeve part 21. On the other hand in case the dimensions of the sheet 12 only slightly exceed the diameter of the pipe 10, the sleeve 21 will be shorter and the part extending across the pipe will be substantially flat or taut as indicated in FIG. 2.

The method of installation may also be varied, it being possible, or even preferable in cases, to insert the band 14 inwardly of the tool 19, release the band to the extent it will spring outwardly, withdraw the tool 19, and then fit the band 14 tightly against the sleeve 21, if part of it may still be arched inwardly.

The invention relates to inexpensive pipe protection to protect pipe against corrosion by closing the pipe ends in the presence of a vapor phase inhibitor within the pipe, and it also relates to an inexpensive and rapidly installed pipe end closure, and to its method of installation, and to the tools employed therein. In regard to the invention it is therefore stated that it is not limited to the exact structures employed, nor the exact method steps or sequence thereof as set forth in the specification hereinabove, but other structures and methods are considered as well, as such may fall within the broad spirit of the invention, and within the broad scope of interpretation claimed and merited by the appended claim.

What is claimed is:

The combination of a pipe and a pipe end closure, said pipe end closure comprising a pliant, foldable sheet of weather resistant material for insertion into the end of said pipe and including an inwardly convex, pliant closure portion of substantial rigidity innermost with relation to the pipe to extend thereacross and a pipe contacting sleeve part outwardly of said closure member with relation to the pipe, said sleeve part being of greater diameter than the pipe whereby overfolding and underfolded surfaces occur therein, and said closure including a band within said sleeve adjacent the outer end thereof in tightly engaged contact with the inner surfaces of said sleeve and urging said sleeve into tightly engaged outer surface contact with the inside of said pipe, whereby air in limited degree may pass between the overfolding and underfolded sleeve surfaces and guided inwardly about said convex closure portion and whereby resistance is offered to the passage of rain and the like between said overfolding and underfolded surfaces.

References Cited in the file of this patent

UNITED STATES PATENTS

| | | |
|---|---|---|
| 153,265 | Miller | July 21, 1874 |
| 1,016,620 | Gapp | Feb. 6, 1912 |
| 1,906,593 | Higgins | May 2, 1933 |
| 2,737,205 | Stringfield | Mar. 6, 1956 |
| 2,824,782 | Ross et al. | Feb. 25, 1958 |
| 2,840,113 | Simpson et al. | June 24, 1958 |
| 2,845,328 | Fleishhacker | July 29, 1958 |

FOREIGN PATENTS

| | | |
|---|---|---|
| 662,970 | France | Aug. 14, 1929 |
| 548,180 | Canada | Oct. 29, 1957 |